INVENTOR
Karl Schmidt
BY Otto Ratz
ATTORNEY

Patented Aug. 14, 1928.

1,680,806

UNITED STATES PATENT OFFICE.

KARL SCHMIDT, OF BERLIN-SUDENDE, GERMANY, ASSIGNOR TO C. LORENZ AKTIEN-GESELLSCHAFT, OF BERLIN-TEMPELHOF, GERMANY.

REGULATING SYSTEM FOR MAINTAINING ELECTRIC CONVERTERS AT A CONSTANT SPEED.

Original application filed January 15, 1924, Serial No. 686,432, and in Germany February 17, 1923. Divided and this application filed June 6, 1925. Serial No. 35,501.

This invention relates to speed regulating systems for maintaining electric converters at a constant speed, and applies particularly to speed regulating systems of that kind shown, for example, in my prior application, Serial No. 686,432, filed January 15, 1924, of which this application is a division, wherein a regulator is employed in association with a dynamo, in contradistinction to the use of a relay, for controlling the speed of an electric motor whereby the dynamo is driven, such regulator being for the purposes of the present invention, of suitable construction, but, in the form disclosed in said application, Serial No. 686,432, comprising a resilient member supporting a contact weight and mounted on a vertically rotating disk carrying a contact member, said contact elements operating under the combined actions of centrifugal force and gravity once during each revolution of the disk to open and close a circuit whereby an electrical load is periodically imposed upon and withdrawn from the driving motor so as to control its speed and hold it at a constant value with such a degree of uniformity as is not possible with the speed regulating devices heretofore in use. The present invention premises the use of a regulator of such type or one acting equivalently for controlling a load circuit in a controlling system of the character herein described.

In the operation of electrical converters, it is known that the speed of an electric motor can be maintained more or less constant by providing a centrifugal regulator with an electric contact and by causing this contact to influence the driving motor for regulation of its speed in some suitable way. In order to obtain a sufficiently sensitive regulation, the load on the contact must be very small, that is to say the contact is worked with very weak currents; this however is in most cases too small to influence the driving motor. One or more relays must therefore be interposed; these however have, as is well known, such great disadvantages that it is impossible to obtain a reliable regulation of the driving motor. The object of the present invention is to avoid the use of such relays and to obtain a reliable regulation by making use of a dynamo instead of the relay, the field of which dynamo is controlled by a periodical opening and closing of a contact of the speed regulator and the terminal voltage of which is applied to the driving motor itself.

Figure 1:
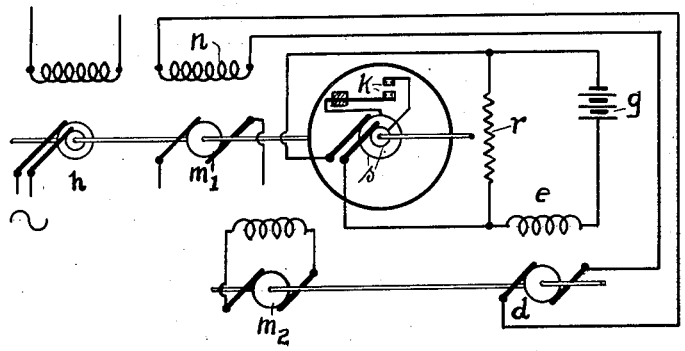

The invention is set forth more particularly by the following description of some practical embodiments represented by the accompanying drawings, of which Fig. 1 is a diagram of connections showing my invention as applied to the speed regulation of a direct current motor.

Figure 2:
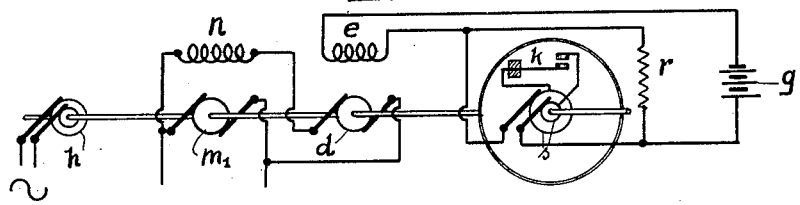
Figure 3:
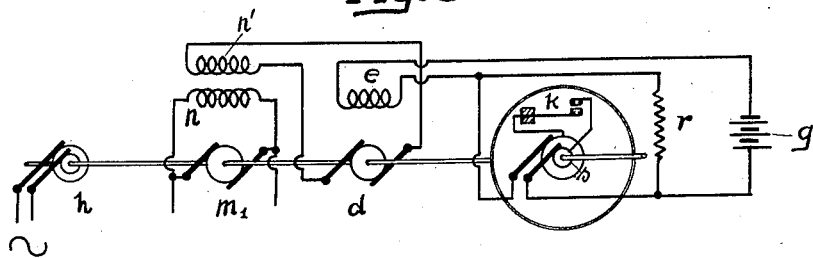
Figure 4:
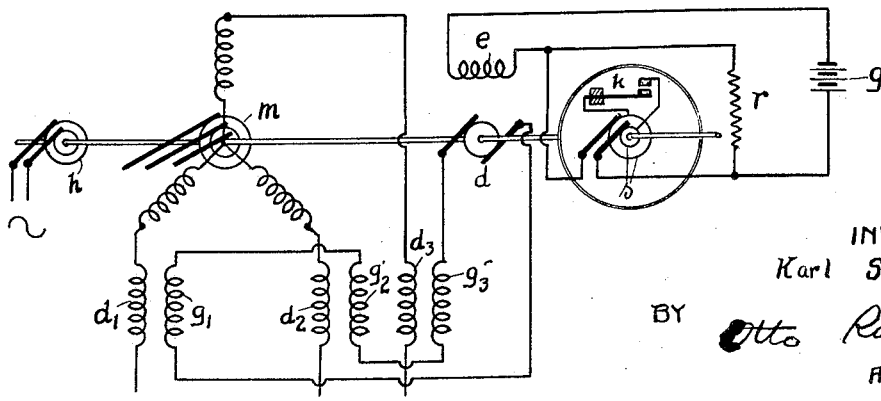

Figs. 2 and 3 refer to improvements of a system according to Fig. 1,

Fig. 4 is a diagram showing how the invention may be practiced in connection with a three-phase motor.

Similar reference characters refer to similar elements throughout the drawings.

Figure 1 of the accompanying drawing illustrates the principle of the arrangement according to the present invention. The set of a high frequency converter comprises a high frequency generator $h$ which is driven by a continuous current motor $m_1$ and on the end of the shaft of which there is mounted a centrifugal regulator provided with a contact device $k$. This contact device $k$ is so controlled by centrifugal force and by a force acting in opposition thereto, that a periodic opening and closing of the contact is effected during the rotation of the centrifugal regulator. The contact is arranged to open and close a resistance $r$ in a well-known manner by the interposition of slip-rings $s$ and to act on a source of continuous current $g$ supplying the excitation winding $e$ of the dynamo $d$ of a converter which is driven by the motor $m_2$. The armature terminals of the dynamo $d$ are connected to the excitation winding $n$ of the motor $m_1$. It will easily be seen that very small currents in the regulating circuit or in the excitation winding $e$ of the dynamo $d$ will be capable of controlling a substantial energy.

Another arrangement according to the invention is illustrated in Figure 2 in which the dynamo $d$ is mounted on the shaft of the converter, the excitation winding $n$ being connected to the supply circuit and to one terminal of the dynamo.

According to a further modification of the invention the motor m is provided with two windings as is illustrated in Figure 3. The motor m is provided with the excitation winding n and in addition thereto with another excitation winding n' which is connected to the terminals of the dynamo. A particular advantage of this arrangement lies therein that the motor has a permanent, constant, fundamental field and the danger of the motor running away is avoided.

Figure 4 illustrates, by way of example, the diagram of a converter in which a three-phase motor m is used as the driving motor. In this arrangement the regulating machine d controls the alternating current chokes $d_1$, $d_2$, $d_3$, inserted in the stator winding of the motor to change the applied terminal voltage through the continuous current windings $g_1$, $g_2$, $g_3$.

What I claim is:—

1. In a speed regulating system for electric converters, a driving motor, a regulating generator, a circuit including a source of electric energy and the exciter winding of the generator, the said generator being operatively connected to the exciter winding of the driving motor for controlling the excitation of said motor, and means directly governed by the speed of the driving motor for energizing and deenergizing said circuit at predetermined motor speeds.

2. In a speed regulating system for electric converters, a driving motor forming part of said converter, a regulating generator, a circuit including a source of electric energy and the exciter winding of the generator, the said generator having its terminals directly connected to the exciter winding of the driving motor for controlling the excitation of said motor, and means independent of the A. C. output of said converter and governed by the speed of the driving motor for energizing and deenergizing said circuit at predetermined motor speeds.

3. In a speed regulating system for electric converters, a driving motor for said converter, a regulating generator, a circuit including a source of electric energy and the exciter winding of the generator, the said generator being operatively connected to the exciter winding of the driving motor for controlling the excitation of said motor, and a centrifugal contact device governed by the speed of the driving motor for energizing and deenergizing said circuit at predetermined motor speeds.

4. In a speed regulating system for electric converters, a driving motor for said converter, a regulating dynamo, a circuit including a source of electric energy and the exciter winding of the dynamo, the said dynamo having its terminals directly connected to the exciter winding of the driving motor for controlling the excitation of said motor, and a centrifugal contact device independent of any circuit forming part of the load on said motor and governed by the speed of the driving motor for energizing and deenergizing said circuit at predetermined motor speeds.

5. In a speed regulating system for electric converters, a driving motor, a regulating dynamo, a circuit including a source of electric energy and the exciter winding of the dynamo, the said dynamo being operatively connected to the exciter winding of the driving motor for controlling the excitation of said motor, said driving motor exciting winding being independent of said source of current, and a centrifugal contact device on the shaft of the driving motor governed by the speed of the driving motor for energizing and deenergizing said circuit at predetermined motor speeds.

6. In a speed regulating system for electric converters, a driving motor, a direct current regulating dynamo, a circuit including a source of electric energy independent of the armature of the regulating dynamo but including the exciter winding of the dynamo, the said dynamo having its armature terminals directly connected to the exciter winding of the driving motor for controlling the excitation of said motor, and a centrifugal contact device on the shaft of the driving motor governed by the speed of the driving motor for energizing and deenergizing said circuit at predetermined motor speeds.

7. In a speed regulating system for electric converters, a driving motor, a regulating dynamo having a mechanical coupling to said motor, a circuit including a source of electric energy and the exciter winding of the dynamo, the said dynamo having its terminals directly connected to the exciter winding of the driving motor for controlling the excitation of said motor, and a centrifugal contact device on the shaft of the driving motor governed by the speed of the driving motor for energizing and deenergizing said circuit at predetermined motor speeds.

8. In a speed regulator system for an electric motor comprising in combination a rotating disc driven by said motor, a resilient member mounted on said disc and carrying a contact arranged to be opened and closed with respect to a contact carried by said disc, means for effecting contact once for each revolution of said disc, the ratio between the open and closed periods of time of said contact being substantially dependent on the speed, a regulating dynamo having its terminals directly connected to the exciter winding of said motor, a source of current for and an electric resistance in the field circuit of said dynamo and a circuit connection from said contacts to the terminals of said resistance, said dynamo field circuit being independent of said motor exciter winding.

9. In a speed regulator system for an electric motor comprising in combination a rotating disc driven by said motor, a resilient member mounted on said disc and carrying a contact arranged to be opened and closed with respect to a contact carried by said disc, means for effecting contact once for each revolution of said disc, the ratio between the relative lengths of time during which the contact is opened and closed being substantially dependent on the speed, a regulating dynamo operatively connected to the exciter winding of said motor, and driven by said electric motor, and an electric resistance in the field circuit of said dynamo and a circuit connection from said contacts to the terminals of said resistance.

10. In a speed regulator system for an electric motor comprising in combination a rotating disc driven by said motor, a resilient member mounted on said disc and carrying a contact arranged to be opened and closed with respect to a contact carried by said disc, means for effecting contact once for each revolution of said disc, the ratio between the closed and open periods of said contact being substantially dependent on the speed, a regulating dynamo having its terminals directly connected to the exciter winding of said motor and driven by said electric motor, and an electric resistance in the field circuit of said dynamo and a circuit connection from said contacts to the terminals of said resistance.

In testimony whereof I have signed my name to this specification.

K. SCHMIDT.